J. BINGHAM & O. M. POND.
Wheel Plows.
No. 145,147. Patented Dec. 2, 1873.
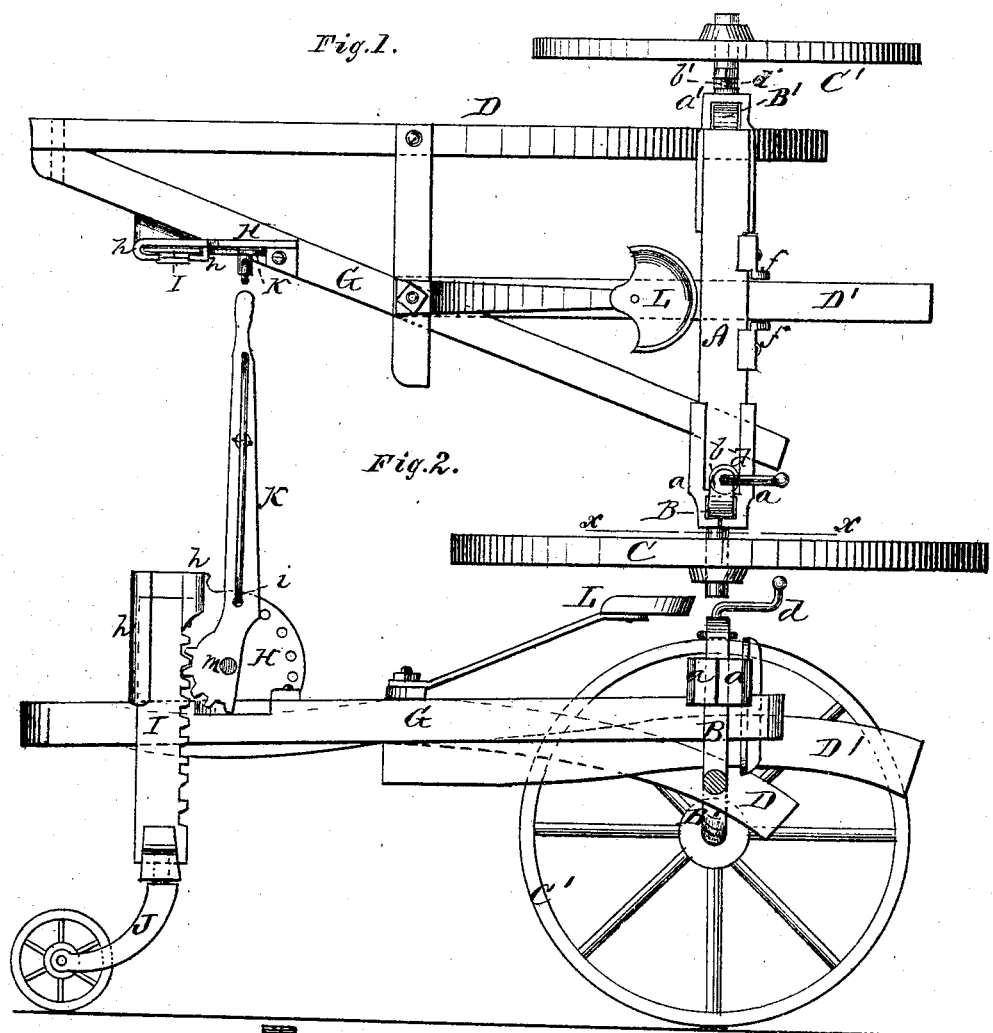
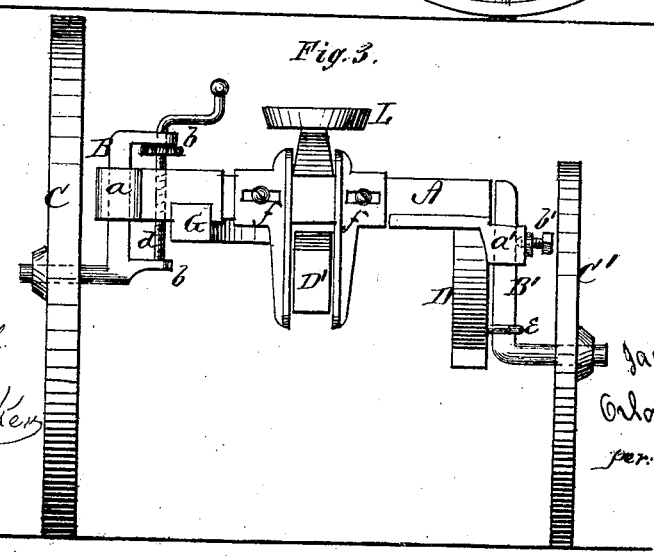

UNITED STATES PATENT OFFICE.

JACOB BINGHAM AND ORLANDO M. POND, OF WATERLOO, IOWA.

IMPROVEMENT IN WHEEL-PLOWS.

Specification forming part of Letters Patent No. 145,147, dated December 2, 1873; application filed October 30, 1873.

*To all whom it may concern:*

Be it known that we, JACOB BINGHAM and ORLANDO M. POND, of Waterloo, in the county of Black Hawk and State of Iowa, have invented certain new and useful Improvements in Plow Attachments; and we do hereby declare that the following is a full, clear, and exact description thereof, reference being had to the accompanying drawings and to the letters of reference marked thereon, which form a part of this specification.

The nature of our invention consists in the construction and arrangement of a plow-carriage, as will be hereinafter more fully set forth.

In order to enable others skilled in the art to which our invention appertains to make and use the same, we will now proceed to describe its construction and operation, referring to the annexed drawing, in which—

Figure 1 is a plan view, Fig. 2 a side elevation, and Fig. 3 a rear view, of our plow-carriage.

A represents the axle, at one end of which, on the front and rear sides, are attached metal bars or plates $a\ a$. These plates or bars lap over the end of the axle and form a square socket or loop, through which passes a bar, B. This bar is, on its lower end, provided with a spindle, upon which the large wheel C is placed. Both ends of the bar B are provided with projections $b\ b$, which extend inward above and below the axle; and through the ends of these projections passes a screw, $d$, which screw also passes through a nut embedded in the end of the axle. The upper end of the screw $d$ is provided with a crank, so that the same can readily be turned in either direction, thereby raising or lowering the wheel-arm B with the wheel C. At the other end of the axle, on the under side, is secured a plate, at the outer end of which, beyond the axle, is formed a square box, $a'$. Through this box passes another wheel-arm, B', for the small wheel C', said arm being held at any height desired by means of a set-screw, $b'$, through the box $a'$. D represents the plow-beam, which is held to the wheel-arm B' by a staple, $e$, and its front end bolted to a beam, G, this beam being bolted to the under side at the other end of the axle A. To the under side of the beam G is pivoted another plow-beam, D', which passes under the axle A between two slotted guides, $f\ f$, fastened on the rear side of the axle. By moving these guides to either side, the distance between the plow-beams is easily regulated. Upon the beam G, near the front end, is secured a plate, H, having vertical guides $h\ h$ at the front end, between which guides moves a bar, I. At the lower end of this bar is affixed an ordinary caster-wheel, J, and the rear edge of the bar is cogged, as shown in Fig. 2. The bar with caster-wheel is raised and lowered by means of a lever, K, having a cogged segment, $m$, at its lower end, and pivoted to the plate H, the cogged segment gearing with the bar I, thereby regulating the depth at which the plows are to work. On the lever K is a spring-pin, $i$, to enter either of a series of holes in the plate H, thereby holding the caster-wheel at any height desired. L is the driver's seat, supported upon the beam G.

Having thus fully described our invention, what we claim as new, and desire to secure by Letters Patent, is—

In a plow-carriage, the axle A, having the adjustable screw lifting device $a\ b\ d$ at one end, and the plate and box $a'$ with set-screw $b'$ at the other end, of the axle, in combination with the plow-beam D and staple $e$, sliding on axle-arm B', and the plow-beam D', adjustable by slotted guides on the axle, substantially in the manner and for the purpose herein set forth.

In testimony that we claim the foregoing as our own, we affix our signatures in presence of two witnesses.

JACOB BINGHAM.
ORLANDO M. POND.

Witnesses:
H. D. JONES,
W. W. MILLER.